US008806489B2

(12) United States Patent
Freimuth et al.

(10) Patent No.: US 8,806,489 B2
(45) Date of Patent: Aug. 12, 2014

(54) VIRTUAL MACHINE IMAGE DISTRIBUTION NETWORK

(75) Inventors: Douglas M. Freimuth, New York, NY (US); Vasileios Pappas, Elmsford, NY (US); Sumedh W. Sathaye, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 13/542,421

(22) Filed: Jul. 5, 2012

(65) Prior Publication Data
US 2014/0013322 A1 Jan. 9, 2014

(51) Int. Cl.
*G06F 9/455* (2006.01)
*G06F 15/173* (2006.01)

(52) U.S. Cl.
USPC ............... 718/1; 709/223; 709/224; 709/226

(58) Field of Classification Search
None
See application file for complete search history.

(56) References Cited

U.S. PATENT DOCUMENTS

| 6,460,045 | B1 | 10/2002 | Aboulnaga et al. | |
|---|---|---|---|---|
| 6,922,831 | B1 | 7/2005 | Kroening et al. | |
| 7,496,613 | B2 | 2/2009 | Raghunath | |
| 7,849,462 | B2 | 12/2010 | Traut et al. | |
| 7,856,439 | B2 | 12/2010 | Alpern et al. | |
| 7,870,039 | B1 | 1/2011 | Dom et al. | |
| 2005/0240563 | A1 | 10/2005 | Domany et al. | |
| 2006/0047855 | A1* | 3/2006 | Gurevich et al. | 709/247 |
| 2006/0155735 | A1* | 7/2006 | Traut et al. | 707/101 |
| 2007/0078846 | A1 | 4/2007 | Gulli et al. | |
| 2007/0299897 | A1 | 12/2007 | Reznik | |
| 2007/0300220 | A1* | 12/2007 | Seliger et al. | 718/1 |
| 2009/0307247 | A1 | 12/2009 | Pollack | |
| 2011/0047133 | A1* | 2/2011 | Alpern et al. | 707/695 |
| 2011/0113012 | A1 | 5/2011 | Gruhl et al. | |
| 2011/0113016 | A1 | 5/2011 | Gruhl et al. | |
| 2011/0145534 | A1* | 6/2011 | Factor et al. | 711/170 |
| 2011/0219372 | A1* | 9/2011 | Agrawal et al. | 718/1 |
| 2012/0005467 | A1* | 1/2012 | Butler et al. | 713/2 |
| 2012/0005675 | A1* | 1/2012 | de Waal | 718/1 |

(Continued)

OTHER PUBLICATIONS

Shi, et al., "Iceberg: an image streamer for space and time efficient provisioning of virtual machines", International Conference on Parallel Processing—Workshops, 2008. IEEE Computer Society, ICPP-W '08., Publication Year: 2008, pp. 31-38, Digital Object Identifier: 10.1109/ICPP-W.2008.13.

(Continued)

*Primary Examiner* — Charles Swift
(74) *Attorney, Agent, or Firm* — Yee & Associates, P.C.; Jennifer Davis

(57) ABSTRACT

Virtual machine images are distributed to, and retrieved from an image distribution network. A virtual machine image is received on the image distribution network and divided into chunks with a unique resource identifier created for each of the chunks. A virtual machine image reassembly file is created. Each of the chunks is assigned a unique resource locator address. An image distribution network server maintains a mapping between unique resource identifier for each of the chunks and the unique resource locator address. When a request to download a virtual machine image is received, chunks of the virtual machine image that are locally present are identified. Chunks of the virtual machine image that are not locally present are mapped to unique resource locator addresses in the image distribution network. When a sufficient number of chunks has been retrieved to instantiate the virtual machine image, the virtual machine image is instantiated.

18 Claims, 7 Drawing Sheets

(56) References Cited

U.S. PATENT DOCUMENTS

| | | | |
|---|---|---|---|
| 2012/0124012 A1 | 5/2012 | Provenzano et al. | |
| 2012/0167087 A1* | 6/2012 | Lee et al. | 718/1 |
| 2012/0192175 A1* | 7/2012 | Dorai et al. | 718/1 |
| 2012/0243795 A1 | 9/2012 | Head | |
| 2012/0254131 A1* | 10/2012 | Al Kiswany et al. | 707/692 |

OTHER PUBLICATIONS

Jin et al., "The effectiveness of deduplication on virtual machine Disk Images", Proceedings of the Israeli Experimental Systems Conference, SYSTOR 2009, ACM International Conference Proceeding Series (United States) 2009, (7), Nov. 10, 2009.

Liao, et al., "VMStore: Distributed storage system for multiple virtual machines", Science China—Information Sciences, Jun. 2011, vol. 54, No. 6, pp. 1104-1118.

Mell et al., "The NIST Definition of Cloud Computing," dated Oct. 7, 2009, 2 pages. Accessed Jan. 27, 2014, http://www.nist.gov/itl/cloud/upload/cloud-def-v15.pdf.

Office Action, dated Mar. 29, 2013 regarding U.S. Appl. No. 13/053,489, 23 pages.

Final Office Action, dated Sep. 19, 2013 regarding U.S. Appl. No. 13/053,489, 23 pages.

Office Action, dated Apr. 1, 2013, regarding U.S. Appl. No. 13/610,414, 31 pages.

Final Office Action, dated Oct. 3, 2013, regarding U.S. Appl. No. 13/610,414, 31 pages.

* cited by examiner

VIRTUAL MACHINE IMAGE DISTRIBUTION NETWORK

This invention was made with Government support under Contract No.: W911QX-10-C-0094 awarded by Defense Advanced Research Projects Agency (DARPA). The Government has certain rights in this invention.

BACKGROUND

1. Field

The disclosure relates generally to the distribution of content across a network. More specifically, the disclosure relates to a computer implemented method, a computer program product, and a data processing system for distributing virtual machine images across an image distribution network.

2. Description of the Related Art

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

SUMMARY

According to one embodiment of the present invention, a computer implemented method and computer program product are provided for distributing and retrieving virtual machine images within an image distribution network. A virtual machine image for publication is received on the image distribution network. The virtual machine image is divided into chunks, and a unique resource identifier is created for each of the chunks. A virtual machine image reassembly file is created. Each of the chunks is assigned a unique resource locator address and optionally an associated chunks list, indicating a download priority between chunks. An image distribution network server maintains a mapping between unique resource identifier for each of the chunks and the unique resource locator address and optionally constructs and maintains associated chunks lists. The mapping is updated in response to a change in the unique resource locator address for at least one of the chunks. The associated chunks list is updated in response to chunk download patterns from clients.

When a request to download a virtual machine image is received, chunks of the virtual machine image that are locally present are identified. Chunks of the virtual machine image that are not locally present are mapped to one or more unique resource locator addresses in the image distribution network. Chunks of the virtual machine image that are not locally present are retrieved, optionally by following the download order indicated by the associated chunks lists of the already downloaded chunks. When a sufficient number of the chunks of the virtual machine image has been retrieved to instantiate the virtual machine image, the virtual machine image is instantiated.

DETAILED DESCRIPTION

Figure 1:
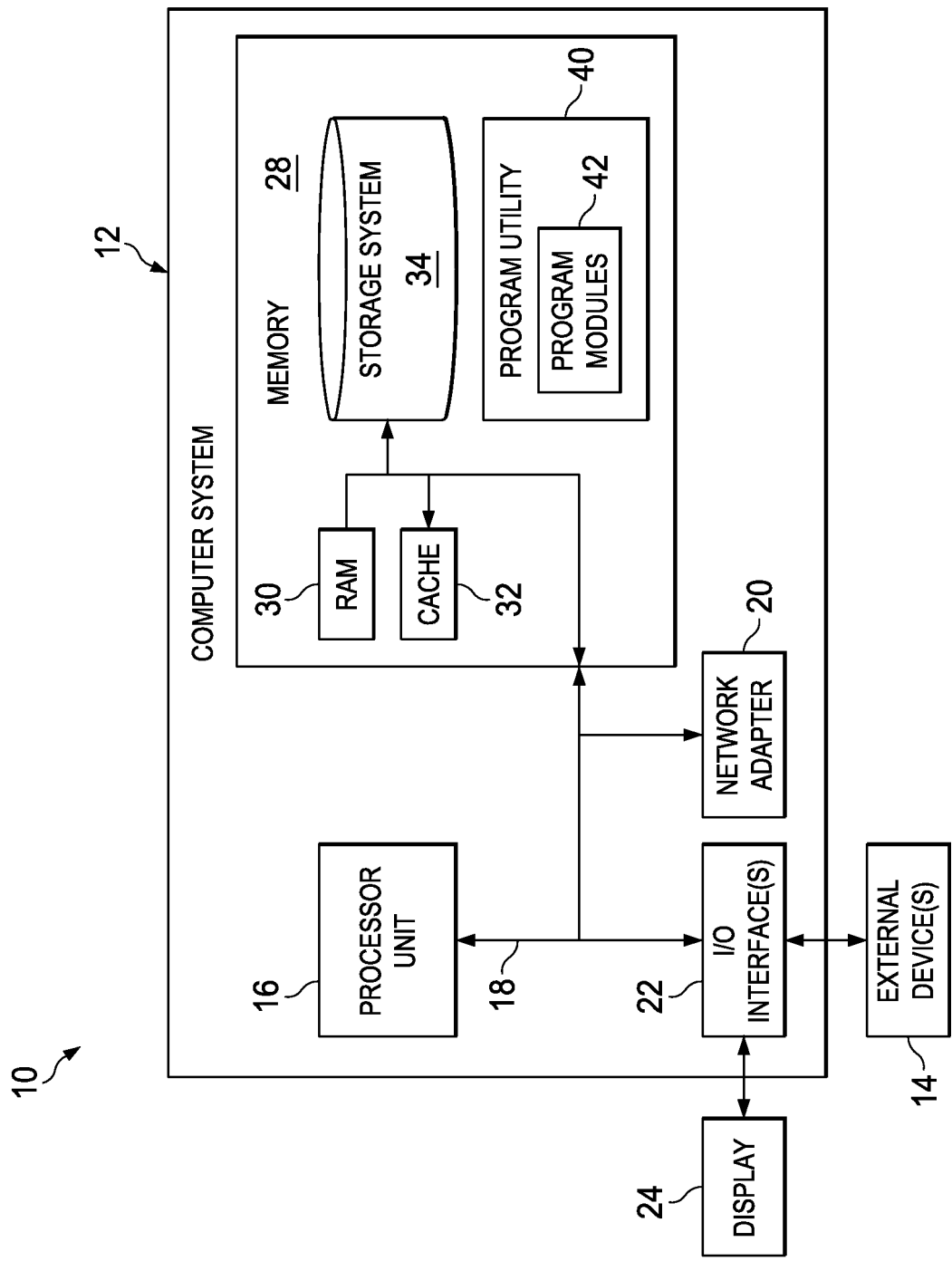
FIG. 1 is a schematic of an example of a cloud computing node shown according to an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
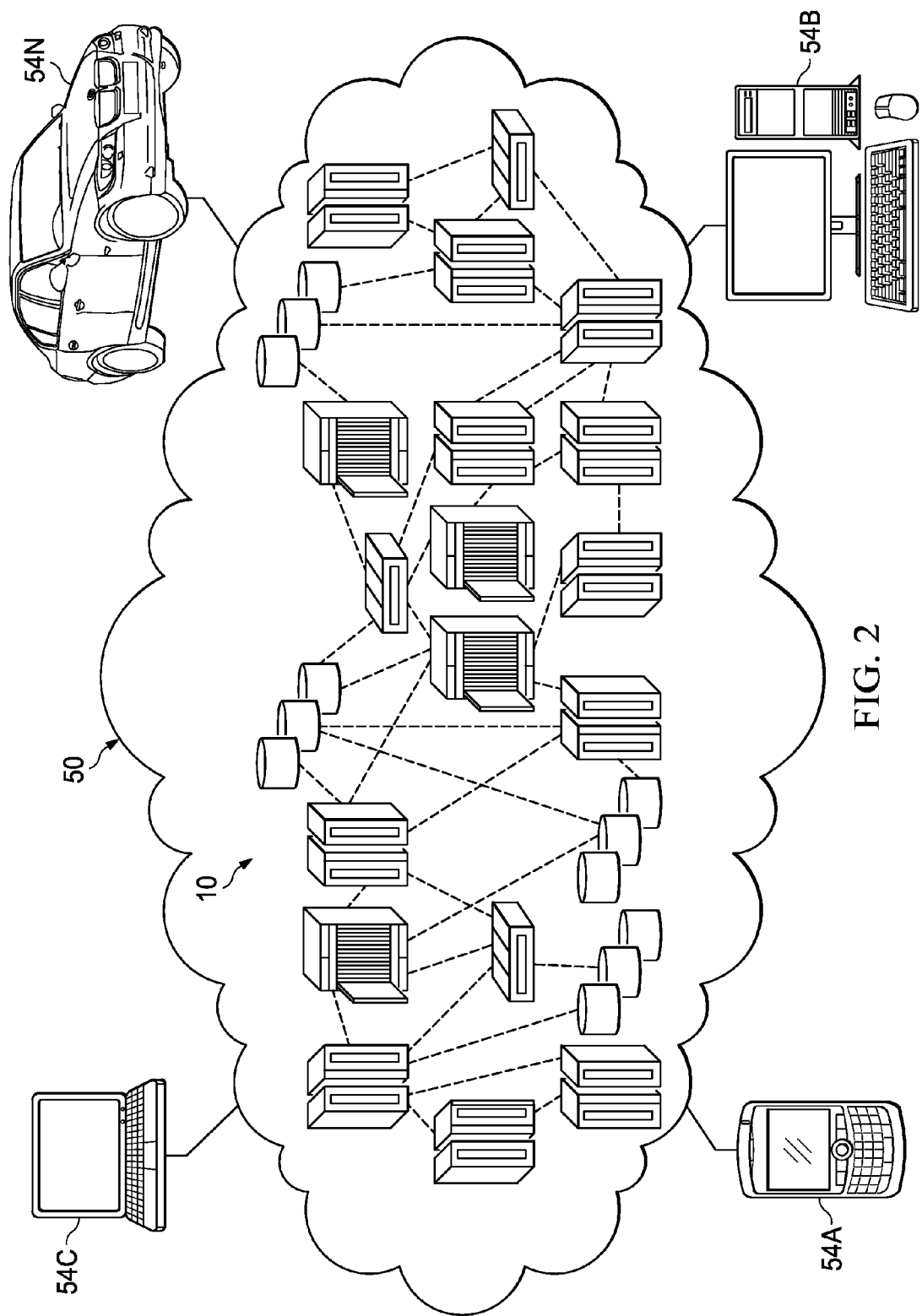
FIG. 2 is illustrative cloud computing environment shown according to an illustrative embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
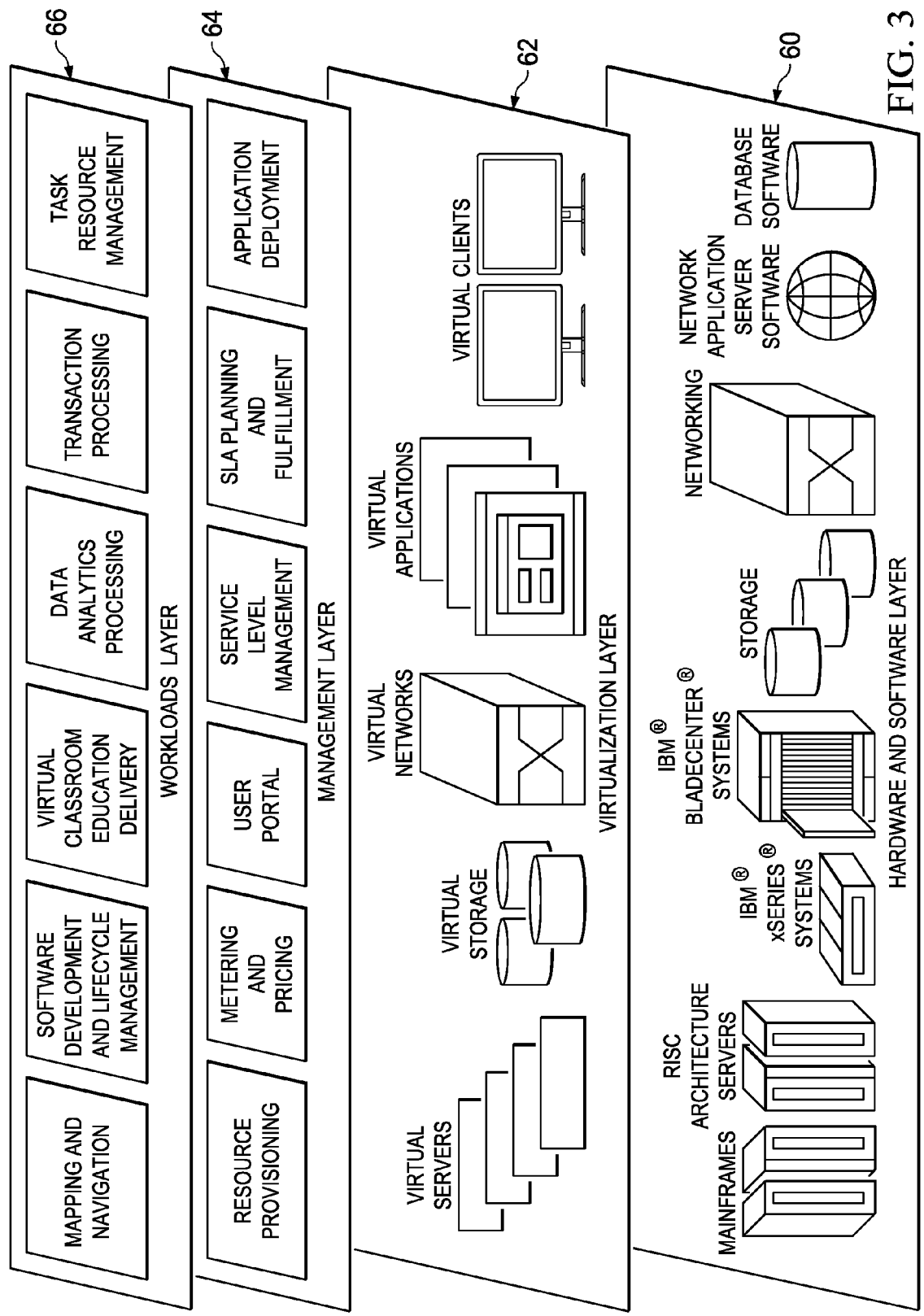
FIG. 3 is set of functional abstraction layers provided by cloud computing environment shown according to an illustrative embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

In one example, management layer 64 may provide the functions described below. Applications, including all of the application components that comprise the application, are typically deployed to a common nodes or virtual machines within a cloud infrastructure. Thus, each instance of an application will contain each application component required for execution of the application.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop processing.

Virtual Machine Images (VMIs) are generally large files, ranging in size up to hundreds of gigabytes. Virtual machine images usually exist within the realm of data centers. Host machines, or physical servers, providing cloud infrastructure, such as node 10 of FIG. 1, usually access virtual machine images through a file system mounted on a local or remote disk, accessed through a network protocol, such as fiber channel, iSCSI, or NFS.

Virtual Machine Images have already started to appear across the whole internet. These virtual machine images can, for example, be found in data centers, at local points of presence, at the edges of wired and wireless networks, and even within end user devices, such as desktops, laptops and smartphones. However, due to the large size of the virtual machine images, scaling the distribution to those host machines has become more important.

Traditional content distribution networks (CDNs) and peer-to-peer (P2P) networks are now the de-facto solutions for distribution of content. However, these systems suffer from several shortcomings that make them inadequate for the distribution of virtual machine images.

Virtual machine images derived from a limited set of root images typically display a high degree of data similarity. However, content distribution networks (CDNs) and peer-to-peer (P2P) networks do not optimize for data similarity across different files.

A host machine can instantiate a virtual machine from a virtual machine image without needing the whole content of the virtual machine image to be logically present on the host machine. However, content distribution networks (CDNs) and peer-to-peer (P2P) networks do not exploit this characteristic of virtual machine images. Instead, content distribution networks (CDNs) and peer-to-peer (P2P) networks currently require the entirety of a file to be present before the file can be executed.

Data access patterns within a virtual machine image are not sequential. Access patterns are usually performed at an operating system page level. However, content distribution networks (CDNs) and peer-to-peer (P2P) networks do not exploit data access patterns when delivering content. Instead, content delivery in content distribution networks (CDNs) is sequential, while in peer-to-peer (P2P) networks content delivery is pseudo-random.

The illustrative embodiment described herein provides for an Image Distribution Network that overcomes the limitations of traditional content delivery networks and peer-to-peer networks in the delivery of large virtual machine images. The Image Distribution Network is aware of data similarity between Virtual Machine images, and as such can reduce redundant downloads of the same data across different virtual machine images. The Image Distribution Network is amendable to partial download of virtual machines images, so that virtual machines can run without the need for full download of their respective virtual machine images. Furthermore, the Image Distribution Networks aware of data access patterns for virtual machine images, so that virtual machines can be instantiated faster than serial download of virtual machine images over a traditional content distribution network or peer-to-peer network.

Thus, illustrative embodiments of the present invention provide a computer implemented method and computer program product for distributing and retrieving Virtual machine images within an image distribution network. A virtual machine image for publication is received on the image distribution network. The virtual machine image is divided into chunks, and a unique resource identifier is created for each of the chunks. A virtual machine image reassembly file is created. Each of the chunks is assigned a unique resource locator address. An image distribution network server maintains a mapping between unique resource identifier for each of the chunks and the unique resource locator address. The mapping is updated in responsive to a change in the unique resource locator address for at least one of the chunks.

When a request to download a virtual machine image is received, chunks of the virtual machine image that are locally present are identified. Chunks of the virtual machine image that are not locally present are mapped to one or more unique resource locator addresses in the image distribution network. Chunks of the virtual machine image that are not locally present are retrieved. When a sufficient number of the chunks of the virtual machine image has been retrieved to instantiate the virtual machine image, the virtual machine image is instantiated.

Figure 4:
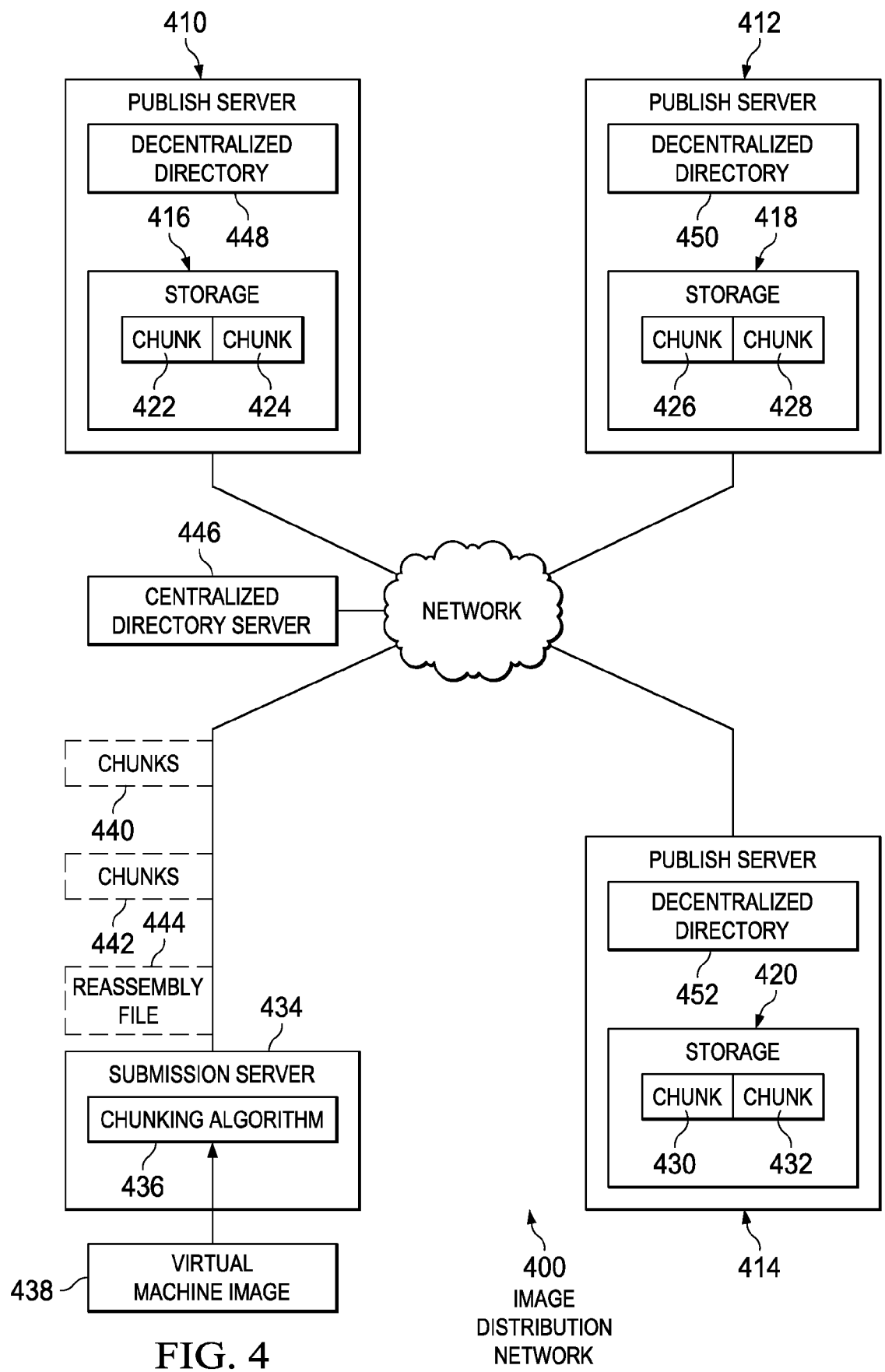
FIG. 4 is a virtual machine image distribution network shown according to an illustrative embodiment.

Referring now to FIG. 4, a virtual machine image distribution network is shown according to an illustrative embodiment.

Image distribution network 400 includes publish servers 410-414. Each of publish servers 410-414 is a server storing virtual machine images that are made available to cloud computing nodes, such as cloud computing node 10 of FIG. 1, for execution within a virtual machine.

Each of publish servers 410-414 includes local storage 416-420 for storing virtual machine images. Virtual machine images are stored within local storage 416-420 as chunks. Each chunk is a "chunk" of data, or byte pattern, the combination of which sums to the virtual machine image. Local storage 416 includes chunk 422-424. Local storage 418 includes chunk 426-428. Local storage 420 includes chunk 430-432.

Each of chunks 422-432 is associated with its own Unique Resource Identifier (URI). Each Unique Resource Identifier (URI) is generated based on the contents of its associated chunk. For example, the URI can be generated using the result of hash function over the contents of the chunk as its URI. The hash function can be a collision resistant hash function, such as one of the Secure Hash Algorithms (SHA) published by the National Institute of Standards and Technology (NIST) as a United States Federal Information Processing Standard (FIPS). The hash function can be, but is not limited to, SHA-1, SHA-2, or SHA-3.

Image distribution network 400 also includes submission server 434. Submission server 434 is a server that accepts new virtual machine images for inclusion into image distribution network 400. In one illustrative embodiment, submission server 434 can be collocated with one or more of publish servers 410-414.

Submission server 434 includes chunking algorithm 436. Chunking algorithm 436 is a procedure for dividing a virtual machine image, such as virtual machine image 438, into chunks 440-442. There are multiple options for the chunking algorithm. In one illustrative embodiment, the chunking algorithm uses the VMI's operating system (OS) pages as chunks. In another illustrative embodiment, the chunking algorithm uses VMI's OS files as chunks. In another illustrative embodiment, the chunking algorithm creates chunks based on the VMI's byte-sequences. For example, a byte-sequence having a certain property can be used by the chunking algorithm to mark the beginning of a new chunk. For example, by using a hash function, if the hash value of the byte-sequence is of a certain value then the beginning of a new chunk is indicated.

Submission server 434 creates reassembly file 444. Reassembly file 444 is a file containing the unique resource identifiers corresponding to chunks 440-442 of virtual machine image 438. Optionally, reassembly file 444 orders chunks 440-442 based on an access pattern of a running instance of the virtual machine instance. For example, in one illustrative embodiment, chunks 440-442 are ordered based on an access sequence of an instantiated virtual machine based on the virtual machine image. Therein, chunks are prioritized in order based on a temporal access by the instantiated virtual machine. In a different example in one illustrative embodiment, chunks 440-442 are ordered based on a number of times that the chunks are accessed by a virtual machine based on the virtual machine image. Therein, chunks that are accessed more frequently by the instantiated virtual machine are prioritized over chunks that are accessed less frequently by the instantiated virtual machine. Reassembly file 444 is published as a text based file onto one or more of publish servers 410-414.

In one illustrative embodiment, the reassembly file can optionally contain for each chunk one or more lists of associated chunk identifiers. Each list of associated chunk identifiers indicates a relationship between one chunk C and a set S of other chunks. For example, in one illustrative embodiment, the relationship can indicate if chunk C has already been accessed, e.g. the host server of the virtual machine image has read or written on a page contained in C, then it is probable that one or more chunks of the set S are going to be accessed as well. Lists of associated chunk identifiers can be used in order to more precisely prioritize the download sequence of the different chunks and adapt it to the different access patterns of the virtual machine image by the host machine.

In one illustrative embodiment, image distribution network can optionally include centralized directory server 446. Centralized directory server 446 is a server that maintains a table of publish servers 410-414, including identification information such as URL addresses for those servers, as well as, which ones of chunks 422-432 are stored on those publish servers. Optionally, centralized directory server 446 can also store metadata descriptions for each of chunks 422-432.

In one illustrative embodiment, image distribution network can optionally include one of decentralized directories 448-452 located at each of publish servers 410-414. Decentralized directories 448-452 are distributed address listings for chunks 422-432. In one illustrative embodiment, each of decentralized directories 448-452 replicate fully or partially the contents of centralized directory server 446, using a distributed hash table.

In one illustrative embodiment, image distribution network can optionally include accounting servers that monitor and record the chunks request history from each client. Using chunks request data from each client, accounting servers create a chunks request model for each virtual machine image. Such a model can indicate access patterns between the chunks of a virtual machine image and can be used to construct and update the list of associated chunk identifiers of each chunk. In another illustrative embodiment, a dedicated host machine within the image distribution network can be used in order to create the chunks requests model for virtual machines images that do not have enough history of chunk requests.

Figure 5:
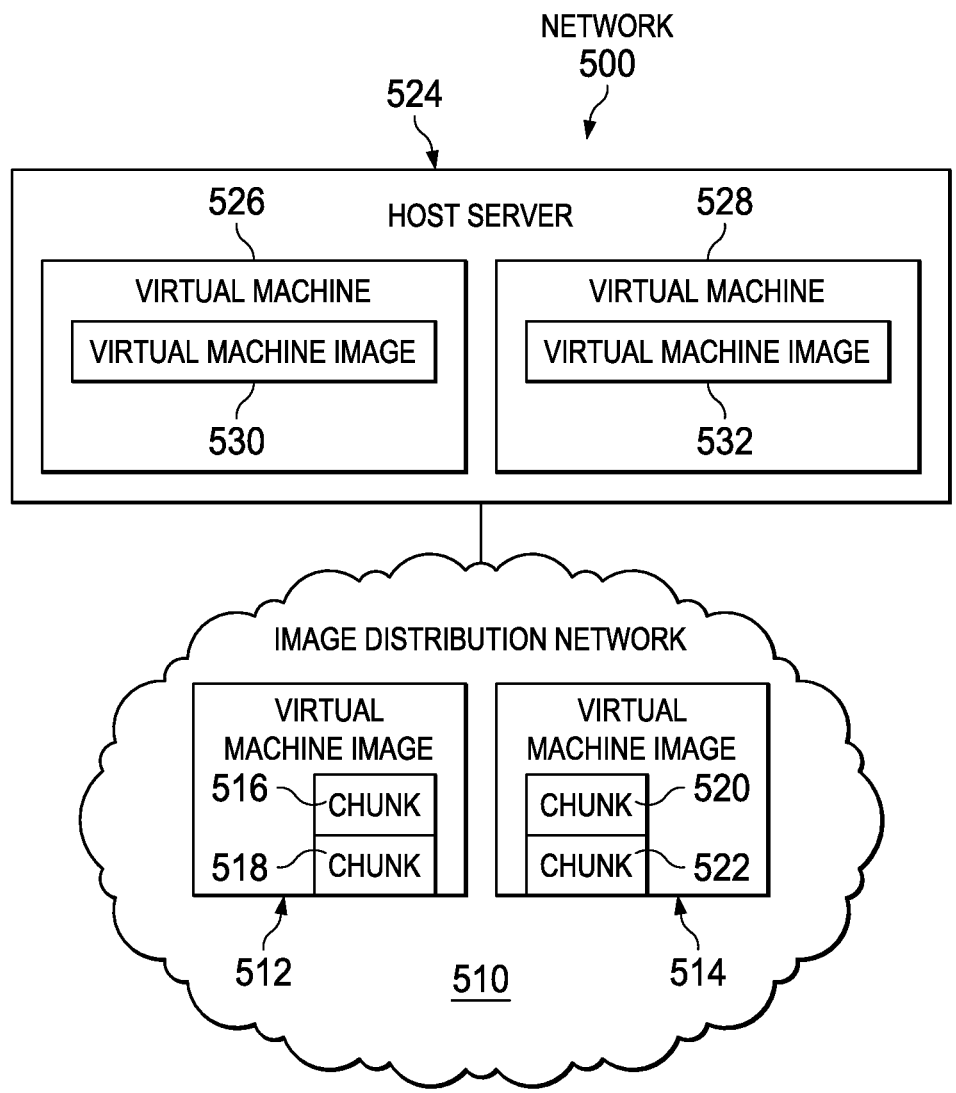
FIG. 5 is a dataflow for performing a software update of an executing virtual machine connected to the Image Distribution Network shown according to an illustrative embodiment.

Referring now to FIG. 5, a dataflow is shown for performing a software update of an executing virtual machine connected to the Image Distribution Network. Network 500 is shown as an example to illustrate the main advantages of the Image Distribution Network.

Image distribution network 510 is image distribution network 400 of FIG. 4. Image distribution network includes a set of virtual machine images, including virtual machine image 512 and virtual machine image 514. Virtual machine image 512 is stored within image distribution network 500 as chunk 516 and chunk 518. Virtual machine image 514 is stored within image distribution network 510 as chunk 520 and chunk 522. Each of chunks 512-522 are chunks such as chunks 422-432 of FIG. 4.

Host server 524 is a cloud-computing node, such as cloud computing node 10 of FIG. 1. Host server 524 allocates virtual machine 526 to run virtual machine image 530. Host server 524 allocates virtual machine 528 to run virtual machine image 532.

Assume that a software update becomes available for virtual machine image 530. The software update can be, for example, virtual machine image 512. Host server 524 would like to replace virtual machine image 530 with virtual machine image 512 in order for the software update to take effect.

Because virtual machine image 512 is an update for virtual machine image 530, a large degree of similarity exists between the images. Chunk 516 is one or more chunks that are similar to virtual machine image 530. Chunk 518 is one or more chunks that are dissimilar to virtual machine image 530.

If virtual machine 526 is executing a process that is affected by the software update, host server 524 needs only to download that portion of virtual machine image 512 that is dissimilar to virtual machine image 530. Therefore, host server 524 retrieves chunk 518, but does not retrieve chunk 516.

If virtual machine 526 is not executing a process that is affected by the software update, host server 524 can instantiate and start virtual machine image 530 prior to retrieving chunk 518. Host server 524 can then retrieve chunk 518 while the virtual machine image 530 is executing, in the background or being as needed, in order to replicate virtual machine image 512 on virtual machine 526.

If host server 524 needs to run a new virtual machine, such as virtual machine 528, host server 524 can use similar chunks from other virtual machines images instead of downloading the entirety of the new image. For example, host server 524 retrieves virtual machine image 514 to execute as virtual machine image 532 within virtual machine 528. Chunk 520 is similar to chunk 516, which host server has already retrieved for execution of virtual machine image 526. Therefore, host server only needs to retrieve chunk 522 before virtual machine 528 can be instantiated.

Figure 6:
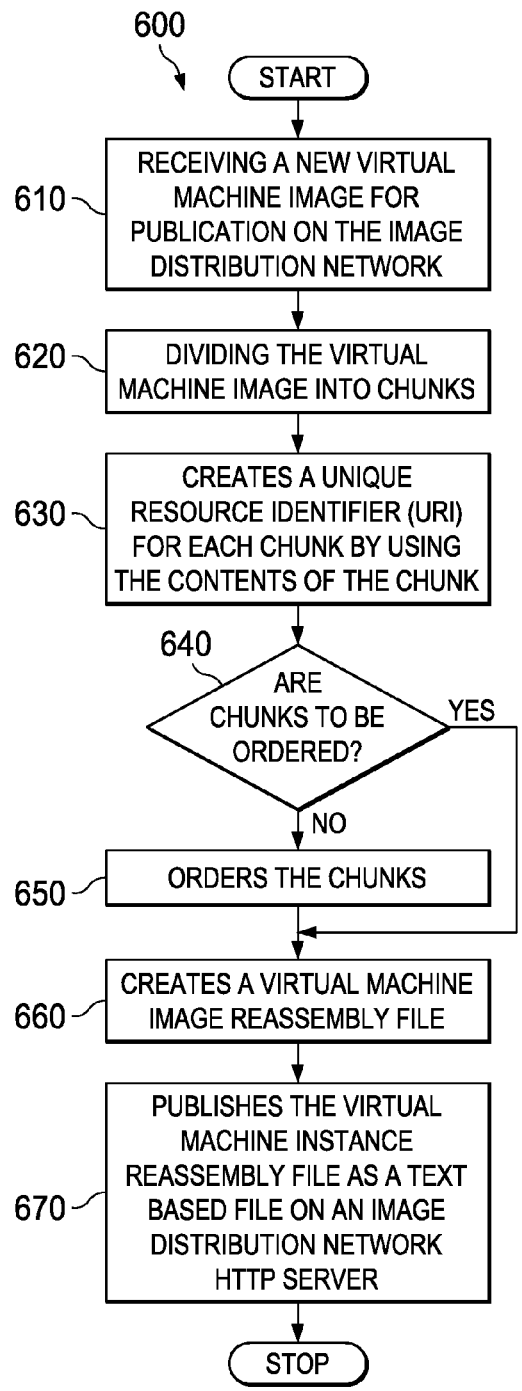
FIG. 6 is flowchart of a process for publishing a virtual machine image to an image distribution network shown according to an illustrative embodiment.

Referring now to FIG. 6, a flowchart of a process for publishing a virtual machine image to an image distribution network is shown according to an illustrative embodiment. Process 600 of FIG. 6 is a software process occurring on a software component, such as chunking algorithm 436 of FIG. 4.

Process 600 begins by receiving a new virtual machine image for publication on the image distribution network (step 610). The new virtual machine image is a virtual machine image such as virtual machine image 438 of FIG. 4.

Responsive to receiving the new virtual machine image, process 600 divides the virtual machine image into chunks (step 620). The chunk is a chunk such as one of chunks 440-442 of FIG. 4. Each chunk is a "chunk" of data, or byte pattern, the combination of which sums to the virtual machine image. There are multiple options for the chunking algorithm. In one illustrative embodiment, the chunking algorithm uses the VMI's operating system (OS) pages as chunks. In another illustrative embodiment, the chunking algorithm uses VMI's OS files as chunks. In another illustrative embodiment, the chunking algorithm creates chunks based on the VMI's byte-sequences. For example, a byte-sequence having a certain property can be used by the chunking algorithm to mark the beginning of a new chunk. For example, by using a hash function, if the hash value of the byte-sequence is of a certain value then the beginning of a new chunk is indicated.

Responsive to dividing the virtual machine image into chunks, process 600 creates a unique resource identifier (URI) for each chunk by using the contents of the chunk (step 630). For example, process 600 can use the result of hash function over the contents of the chunk as its URI. The hash function can be a collision resistant hash function, such as one of the Secure Hash Algorithms (SHA) published by the National Institute of Standards and Technology (NIST) as a United States Federal Information Processing Standard (FIPS). The hash function can be, but is not limited to, SHA-1, SHA-2, or SHA-3.

Optionally, process 600 can order the chunks. If the chunks are to be ordered, ("yes" at step 640), then process 600 orders the chunks (step 650). Otherwise ("no" at step 640), process 600 proceeds directly to step 660. In one illustrative embodiment, process 600 orders the different chunks based on an access pattern of a running instance of the virtual machine instance. For example, in one illustrative embodiment process 600 can order the different chunks based on an access sequence of an instantiated virtual machine based on the virtual machine image. Therein, chunks are prioritized in order based on a temporal access by the instantiated virtual machine. In a different example in one illustrative embodiment, process 600 orders the chunks based on a number of times that the chunks are accessed by a virtual machine based on the virtual machine image. Therein, process 600 prioritizes chunks that are accessed more frequently by the instantiated virtual machine over chunks that are accessed less frequently by the instantiated virtual machine.

Optionally, process 600 can create for each chunk one or more lists of associated chunk identifiers. Each list of associated chunk identifiers indicates a relationship between one chunk C and a set S of other chunks. For example, in one illustrative embodiment, the relationship can indicate if chunk C has already been accessed, e.g. the host server of the virtual machine image has read or written on a page contained in C, then it is probable that one or more chunks of the set S are going to be accessed as well. Lists of associated chunk identifiers can be used in order to more precisely prioritize the download sequence of the different chunks and adapt it to the different access patterns of the virtual machine image by the host machine.

In one illustrative embodiment, the lists of associated chunk identifiers are created by using chunk request history data from clients. Using chunk request data from each client, a chunks request model is created for each virtual machine image. Such a model can indicate access patterns between the chunks of a virtual machine image and can be used to construct and update the list of associated chunk identifiers of each chunk. In another illustrative embodiment, by explicitly executing the virtual machine images, a separate process can be used in order to create the chunks requests model for virtual machine images that do not have enough history of chunk requests from clients.

Process 600 then creates a virtual machine image reassembly file (step 660). The virtual machine instance reassembly file contains the unique resource identifiers for all the chunks of the virtual machine image. Optionally, the virtual machine image reassembly file is ordered based on the ordering of step 650. Optionally, the virtual machine image reassembly file can contain for each chunk a list of associated chunk identifiers. Process 600 then publishes the virtual machine instance reassembly file as a text based file on an image distribution network HTTP server (step 670), with the process terminating thereafter.

Figure 7:
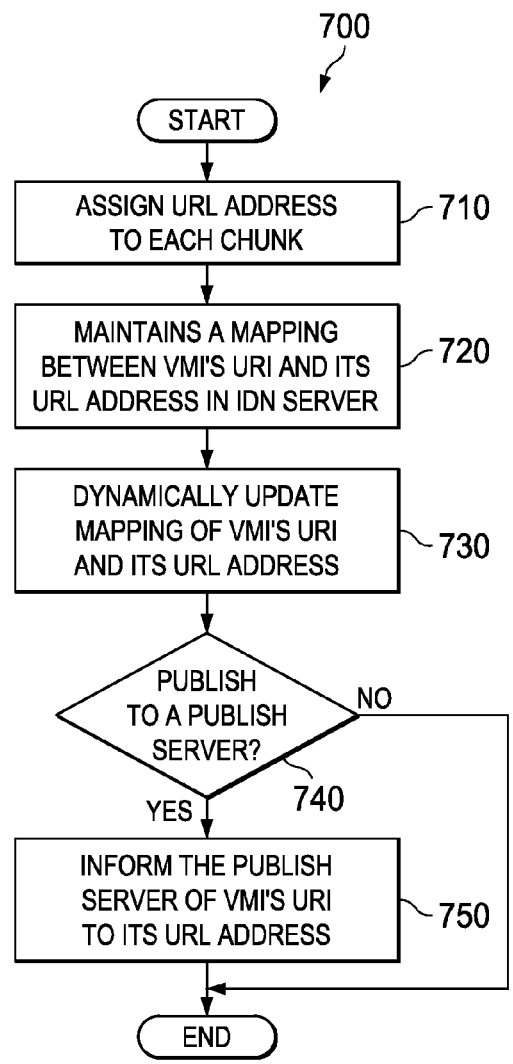
FIG. 7 is flowchart of a process for mapping unique resource identifiers for the chunks to Unique Resource Locators shown according to an illustrative embodiment.

Referring now to FIG. 7, a flowchart of a process for mapping unique resource identifiers for the chunks to Unique Resource Locators is shown according to an illustrative embodiment. Process 700 is a software process, executing on a submission server of an image distribution network, such as such as submission server 434 of FIG. 4. Chunks are replicated (proactively or on-demand) on one or multiple image distribution network HTTP servers.

Process 700 begins by assigning a Unique Resource Locator (URL) address to each chunk (step 710). In one illustrative embodiment, the Unique Resource Locator (URL) address assigned to the chunk is a concatenation of the Unique Resource Locator of the image distribution network HTTP server and the unique resource identifier of the virtual machine image.

Process 700 maintains a mapping between the unique resource identifier of the virtual machine image and its Unique Resource Locator address in the image distribution network HTTP server (step 720). In one illustrative embodiment, the mapping is maintained through a centralized directory server. In another illustrative embodiment, the mapping is maintained in a distributed manner by having the image distribution network HTTP servers replicate the contents of the centralized directory server. The contents of the centralized directory can be replicated either fully or partially using a distributed hash table.

Responsive to a change in a Unique Resource Locator address, process 700 dynamically updates the mapping between the unique resource identifier of the virtual machine image and its Unique Resource Locator address (step 730). The change in a Unique Resource Locator address can be, for example but not limited to, due to one or more chunks being replicated to a new image distribution network HTTP server, or due to one or more chunks deleted from an image distribution network HTTP server.

Optionally, process 700 can inform the image distribution network HTTP publish server of the mapping of the unique resource identifier of the virtual machine image to its Unique Resource Locator address. In response to determining that mapping of the unique resource identifier of the virtual machine image to Unique Resource Locator address should be published to the image distribution network HTTP publish server ("yes" at step 740), process 700 informs the image distribution network HTTP publish server of the mapping of the unique resource identifier of the virtual machine image to Unique Resource Locator address (step 750), with the process terminating thereafter. The mapping of the unique resource identifier of the virtual machine image to Unique Resource Locator address can then be updated dynamically as the mappings change.

Figure 8:
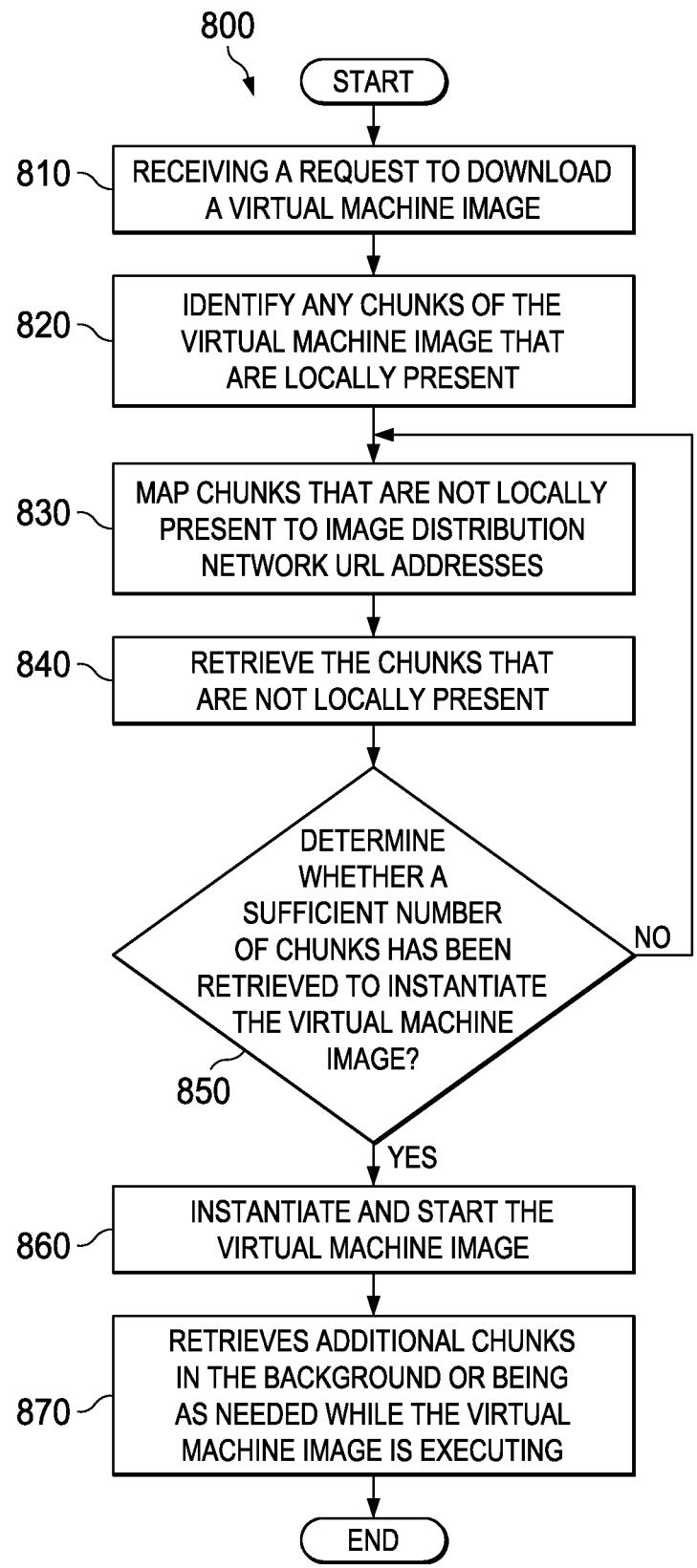
FIG. 8 is flowchart of a process for reconstructing virtual machine images shown according to an illustrative embodiment.

Referring now to FIG. 8, a flowchart of a process for reconstructing virtual machine images is shown according to an illustrative embodiment. Process 800 is a software process, executing on a host server, such as host server 524 of FIG. 5. An image distribution network, such as image distribution network 400 of FIG. 4, can fully or partially reconstruct virtual machine images by downloading chunks of that virtual machine image using the mapped Unique Resource Locator address of those chunks.

Process 800 begins by receiving a request to download a virtual machine image (step 810). The virtual machine image can be, for example, virtual machine image 438 of FIG. 4.

Process 800 identifies any chunks of the virtual machine image that are locally present (step 820). A chunk is locally present if that chunk is stored at the image distribution network HTTP server executing process 800. Chunks can be present, for example but not limited to, from previous downloads of other virtual machine images that happened to have chunks with the identical content. In one illustrative embodiment, chunks with the same content have the same unique resource identifier independent of the virtual machine image that generated the chunk. Therefore, identifying locally present chunks is a simple unique resource identifier lookup on a directory between unique resource identifiers and chunks that is maintained locally on every client.

Process 800 maps chunks that are not locally present to image distribution network Unique Resource Locator addresses (step 830). In one illustrative embodiment, the mapping can be done using predefined rules or by consulting the image distribution network unique resource identifier of the virtual machine image to Unique Resource Locator address mapping service. In one illustrative embodiment, a predefined rule may state that a same server Unique Resource Locator address should always be appended before a unique resource identifier of the virtual machine image. In another illustrative embodiment, the image distribution network unique resource identifier of the virtual machine image to Unique Resource Locator address mapping service can dynamically redirect the client to the most suitable image distribution network HTTP server using various policies. A policy may state, for example but not limited to, always to redirect a client to a closest server in terms of network distance. Another policy may state, for example but not limited to, to always redirect the client to a least loaded image distribution network HTTP server or an image distribution network HTTP server on the least loaded network path. Process 800 then begins to retrieve the chunks that are not locally present (step 840).

Process 800 then determines whether a sufficient number of chunks have been retrieved to instantiate the virtual machine image (step 850). Process 800 does not necessarily have to retrieve all of the chunks of the virtual machine image before instantiating the virtual machine image. Instead, rules, such as for example having a specially marked chunk, or requiring a that certain percentage of chunks be downloaded, can be used to indicate that a sufficient number of chunks has been retrieved to begin the instantiation of the virtual machine image.

Responsive to determining that a sufficient number of chunks has not been retrieved to instantiate the virtual machine image ("no" at step 850), process 800 iterates back to step 830 and continues to retrieve chunks for the virtual machine image. However, responsive to determining that a sufficient number of chunks has been retrieved to instantiate the virtual machine image ("yes" at step 850), process 800 instantiates and starts the virtual machine image (step 860). Process 800 then retrieves any additional chunks while the virtual machine image is executing, in the background or being as needed (step 870), with the process terminating thereafter. Process 800 can optionally use ordering of chunks and/or the lists of associated chunk identifiers in order to prioritize the download sequence of the remaining chunks.

Thus, the illustrative embodiments described herein provide a method for distributing virtual machine images. Virtual machine images are distributed to, and retrieved from an image distribution network. A virtual machine image for publication is received on the image distribution network. The virtual machine image is divided into chunks, and a unique resource identifier is created for each of the chunks. A virtual machine image reassembly file is created. Each of the chunks is assigned a unique resource locator address. An image distribution network server maintains a mapping between unique resource identifier for each of the chunks and the unique resource locator address. The mapping is updated in response to a change in the unique resource locator address for at least one of the chunks.

When a request to download a virtual machine image is received, chunks of the virtual machine image that are locally present are identified. Chunks of the virtual machine image that are not locally present are mapped to one or more unique resource locator addresses in the image distribution network. Chunks of the virtual machine image that are not locally present are retrieved. When a sufficient number of the chunks of the virtual machine image has been retrieved to instantiate the virtual machine image, the virtual machine image is instantiated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen best to explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for distributing a virtual machine image to an image distribution network, the method comprising:

receiving, by a computer, the virtual machine image for publication on the image distribution network;

dividing, by the computer, the virtual machine image into chunks;

creating, by the computer, a unique resource identifier for each of the chunks; and creating, by the computer, a virtual machine image reassembly file for the virtual machine image, wherein the unique resource identifier for each of the chunks of the virtual machine image is prioritized in an order within the virtual machine image reassembly file based on a temporal access sequence pattern of the chunks by a running virtual machine, and wherein the unique resource identifier for each of the chunks is associated with one or more unique resource identifiers of other chunks based on a chunk access pattern between the chunks of the virtual machine image.

2. The computer implemented method of claim 1, wherein the unique resource identifier is created for a chunk using a hash function over contents of the chunk.

3. The computer implemented method of claim 1, wherein the virtual machine image reassembly file comprises the unique resource identifier for each of the chunks.

4. The computer implemented method of claim 1, further comprising:

assigning, by the computer, a unique resource locator address to each of the chunks;

maintaining, by the computer, a mapping between the unique resource identifier for each of the chunks and the unique resource locator address for each of the chunks in an image distribution network server; and responsive to a change in the unique resource locator address for at least one of the chunks, updating, by the computer, the mapping between the unique resource identifier for each of the chunks associated with the change and the unique resource locator address that was changed.

5. The computer implemented method of claim 4, wherein the unique resource locator address assigned to a chunk is a concatenation of a unique resource locator address of the image distribution network server and the unique resource identifier of the chunk.

6. The computer implemented method of claim 4, wherein the change in a unique resource locator address occurs when one or more of the chunks are replicated to a new image distribution network server or when one or more chunks are deleted from the image distribution network server.

7. A computer implemented method for retrieving a virtual machine image from an image distribution network, the method comprising:

receiving, by a computer, a request to download the virtual machine image;

identifying, by the computer, chunks of the virtual machine image that are locally present;

mapping, by the computer, the chunks of the virtual machine image that are not locally present to one or more unique resource locator addresses in the image distribution network;

retrieving, by the computer, the chunks of the virtual machine image that are not locally present;

determining, by the computer, whether a sufficient number of the chunks of the virtual machine image has been retrieved to instantiate the virtual machine image based on retrieval of a specially marked chunk that indicates the sufficient number of the chunks has been retrieved to instantiate the virtual machine image; and responsive to the computer determining that the sufficient number of the chunks of the virtual machine image has been retrieved to instantiate the virtual machine image based on the retrieval of the specially marked chunk that indicates the sufficient number of the chunks has been retrieved to instantiate the virtual machine image, instantiating, by the computer, the virtual machine image.

8. The computer implemented method of claim 7, wherein the step of identifying chunks of the virtual machine image that are locally present further comprises a lookup of a unique resource identifier on a directory mapping unique resource identifiers and chunks that are maintained locally.

9. The computer implemented method of claim 7, wherein the step of mapping the chunks of the virtual machine image that are not locally present comprises mapping the chunks of the virtual machine image that are not locally present by using a predefined rule stating that a server unique resource locator address is appended before a unique resource identifier of the virtual machine image.

10. A computer program product for distributing a virtual machine image to an image distribution network, the computer program product comprising:

one or more non-transitory computer-readable storage mediums;

program instructions, stored on at least one of the one or more non-transitory computer-readable storage mediums, to receive the virtual machine image for publication on the image distribution network;

program instructions, stored on at least one of the one or more non-transitory computer-readable storage mediums, to divide the virtual machine image into chunks;

program instructions, stored on at least one of the one or more non-transitory computer-readable storage mediums, to create a unique resource identifier for each of the chunks; and program instructions, stored on at least one of the one or more non-transitory computer-readable storage mediums, to create a virtual machine image reassembly file for the virtual machine image, wherein the unique resource identifier for each of the chunks of the virtual machine image is prioritized in an order within the virtual machine image reassembly file based on a temporal access sequence pattern of the chunks by a running virtual machine, and wherein the unique resource identifier for each of the chunks is associated with one or more unique resource identifiers of other chunks based on a chunk access pattern between the chunks of the virtual machine image.

11. The computer program product of claim 10, wherein the unique resource identifier is created for a chunk using a hash function over contents of the chunk.

12. The computer program product of claim 10, wherein the virtual machine image reassembly file comprises the unique resource identifier for each of the chunks.

13. The computer program product of claim 10, further comprising:

program instructions, stored on at least one of the one or more non-transitory computer-readable storage mediums, to assign a unique resource locator address to each of the chunks;

program instructions, stored on at least one of the one or more non-transitory computer-readable storage mediums, to maintain a mapping between the unique resource identifier for each of the chunks and the unique resource locator address for each of the chunks in an image distribution network server; and program instructions, stored on at least one of the one or more non-transitory computer-readable storage mediums, responsive to a change in the unique resource locator address for at least one of the chunks, to update the mapping between the unique resource identifier for each of the chunks associated with the change and the unique resource locator address that was changed.

14. The computer program product of claim 13, wherein the unique resource locator address assigned to a chunk is a concatenation of a unique resource locator address of the image distribution network server and the unique resource identifier of the chunk.

15. The computer program product of claim 13, wherein the change in a unique resource locator address occurs when one or more of the chunks are replicated to a new image distribution network server or when one or more chunks are deleted from the image distribution network server.

16. A computer program product for retrieving a virtual machine image from an image distribution network, the computer program product comprising:

one or more non-transitory computer-readable storage mediums;

program instructions, stored on at least one of the one or more non-transitory computer-readable storage mediums, to receive a request to download the virtual machine image;

program instructions, stored on at least one of the one or more non-transitory computer-readable storage mediums, to identify chunks of the virtual machine image that are locally present;

program instructions, stored on at least one of the one or more non-transitory computer-readable storage mediums, to map the chunks of the virtual machine image that are not locally present to one or more unique resource locator addresses in the image distribution network;

program instructions, stored on at least one of the one or more non-transitory computer-readable storage mediums, to retrieve the chunks of the virtual machine image that are not locally present;

program instructions, stored on at least one of the one or more non-transitory computer-readable storage mediums, to determine whether a sufficient number of the chunks of the virtual machine image has been retrieved to instantiate the virtual machine image based on retrieval of a specially marked chunk that indicates the sufficient number of the chunks has been retrieved to instantiate the virtual machine image; and program instructions, stored on at least one of the one or more non-transitory computer-readable storage mediums, responsive to determining that the sufficient number of the chunks of the virtual machine image has been retrieved to instantiate the virtual machine image based on the retrieval of the specially marked chunk that indicates the sufficient number of the chunks has been retrieved to instantiate the virtual machine image, to instantiate the virtual machine image.

17. The computer program product of claim 16, wherein the program instructions to identify the chunks of the virtual machine image that are locally present further comprises a lookup of a unique resource identifier on a directory mapping unique resource identifiers and chunks that are maintained locally.

18. The computer program product of claim 16, wherein the program instructions to map the chunks of the virtual machine image that are not locally present comprises mapping the chunks of the virtual machine image that are not locally present by using a predefined rule stating that a server unique resource locator address is appended before a unique resource identifier of the virtual machine image.

* * * * *